United States Patent [19]

Messiou

[11] Patent Number: 4,868,391

[45] Date of Patent: Sep. 19, 1989

[54] INFRARED LENS ARRAYS

[75] Inventor: Antoine Y. Messiou, Southampton, England

[73] Assignee: U.S. Philips Corp., New York, N.Y.

[21] Appl. No.: 219,532

[22] Filed: Jul. 15, 1988

[30] Foreign Application Priority Data

Jul. 27, 1987 [GB] United Kingdom ............... 8717733

[51] Int. Cl.$^4$ .............................................. G01J 1/00
[52] U.S. Cl. .................................... 250/353; 250/342
[58] Field of Search ...................... 250/342, 353, 221

[56] References Cited

U.S. PATENT DOCUMENTS

| 4,275,303 | 6/1981 | Mudge | 250/342 |
| 4,321,594 | 3/1982 | Galvin et al. | 250/342 |
| 4,717,821 | 1/1988 | Messiou | 250/221 |
| 4,734,585 | 3/1988 | Owers | 250/342 |

Primary Examiner—Janice A. Howell
Assistant Examiner—T. Nguyen
Attorney, Agent, or Firm—William L. Botjer

[57] ABSTRACT

An array of lenses is provided for focusing thermal infrared radiation onto a detector from a set of arcuately displaced directions 7, 8, 9, 10, 11 to detect intruders. The lenses are formed as fresnel lenses, typically, in a sheet 17 of radiation transmissive material as two planar leaves 18, 19 transverse to one another, one horizontal, the other vertical. With the detector 6 set to receive focused radiation from both leaves, the radiation at each lens is more nearly normal to the lenses, greatly reducing transmission losses from directions almost under the array and from horizontal directions. Also, when moulded as a single sheet, the intersecting edge 20 of the two sheets greatly increases the mechanical rigidity of the array. Being flat, a lip 32 can be provided around the sheet edge for easy mounting and good dust sealing.

12 Claims, 3 Drawing Sheets

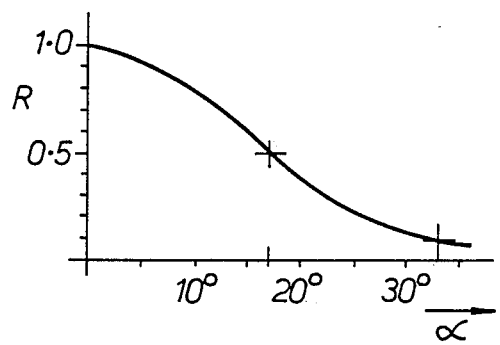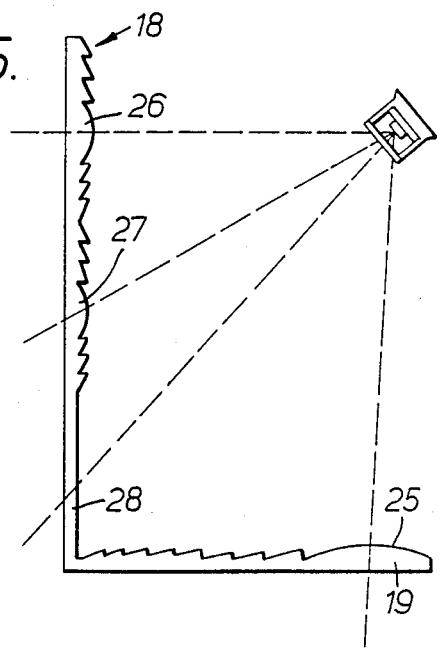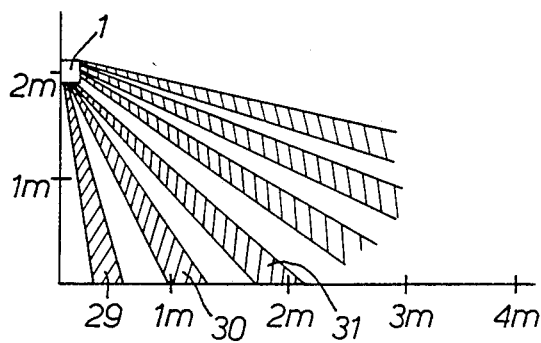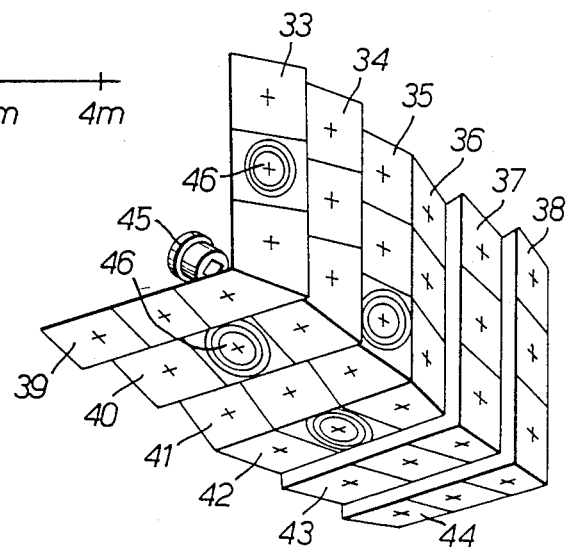

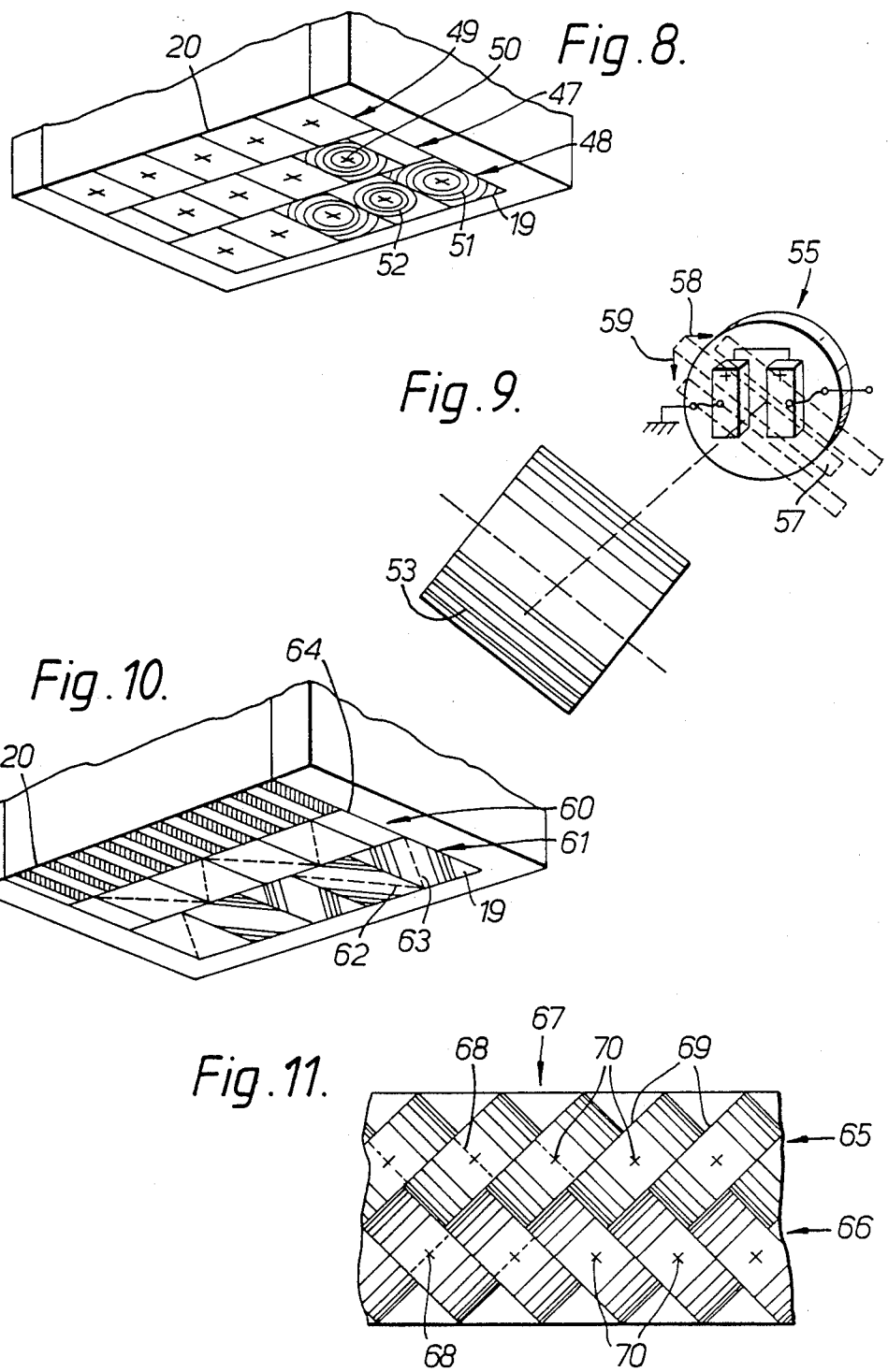

INFRARED LENS ARRAYS

BACKGROUND OF THE INVENTION

This invention relates to arrays of lenses for focusing thermal infrared radiation, that is, radiation in the wavelength range 8 to 13 microns. More particularly, it relates to an array of lenses for directing and concentrating radiation from a plurality of arcuately displaced directions onto a detector, said lenses being formed as planar radiation concentrators in a sheet of radiation transmissive material. The lenses can be moulded in a thin sheet of plastics material, for example, polyethylene. Although such a material has a relatively poor transmission, absorption loss is low since the sheet is thin. The planar radiation concentrators would most commonly be fresnel lenses. However, the focusing action can be obtained from planar diffracting elements such as zone plates. Such elements can also be moulded in sheet form from a master.

In European patent application 0,197,583 A1 which corresponds to U.S. Pat. No. 4,717,821 issued Jan. 5, 1988, an array of fresnel lenses, moulded in planar form, is described for use in an infrared intruder alarm. The passage of an intruder across any one of the arcuately displaced directions generates a signal in a detector placed to receive the image of the intruder focused by the associated lens. Each direction is defined by the line joining the detector to the pole of the associated lens.

It is desirable in such an intruder alarm that a single detector should cover directions over as wide a range of angles as possible for economy in the number of alarms systems needed to cover any given volume. As the range of angles of the directions becomes larger, the angle between the normal to the sheet surface and the extreme directions becomes larger. Consequently there is an increase in radiation lost by reflection before it can reach the detector, by lens aberrations enlarging the focused image, deflecting radiation away from the detector, and by off-axis lens aperture reduction. Typically, when the angle of incidence of radiation on the sheet is 17 degrees, the lost radiation is half the total. At 33 degrees incidence, the lost radiation is 90 per cent of the total, only 10 percent reaching the detector.

In a typical installation, the alarm is mounted high upon a wall to look out into a volume in directions roughly parallel to the floor. But an intruder may enter the volume by creeping along close to the wall under the alarm. In this case the direction to the intruder will be roughly 70 to 80 degrees to the directions looking out into the protected volume. With a single flat sheet of lenses set at a compromise angle, the radiation loss from the "creep" zone and from distant sources would both be unacceptably large.

However, it is important that the lens array should be a straightforward production proposition in the interest of cheapness. The making of a steel mould to produce the plastic sheet lens array will be greatly simplified and cheapened if the array is composed of a substantially flat sheet.

SUMMARY OF THE INVENTION

It is an object of the invention to produce an array of lenses offering a wide range of detection angles at low radiation loss and yet which is cheap to produce. The invention provides an array of lenses for directing and concentrating radiation from a plurality of arcuately displaced directions onto a detector, said lenses being formed as planar radiation concentrators in a sheet of radiation transmissive material, characterised in that the sheet comprises two planar leaves transverse to one another, the planes of the leaves intersecting at an edge, and in that each leaf comprises a plurality of planar radiation concentrators. The array of lenses may be characterised in that the planar radiation concentrators are fresnel lenses.

In a typical intruder alarm, the two leaves in the intruder alarm would be arranged so that one leaf is horizontal and the other vertical. By directing the detector typically some 15 degrees downward, there will then be directions of focused radiation detection nearly vertically downwards which are nearly normal to the horizontal leaf and other directions horizontally outwards normal to the vertical leaf. Thus in these two mutually transverse directions, radiation loss at the associated lenses in the leaves will be a considerably better compromise. The volumetric coverage of the intruder alarm with high sensitivity is thereby markedly improved over an alarm having a single flat sheet of lenses.

In some embodiments of the invention, portions of a leaf adjacent to he intersecting edge may be inclined at a substantial angle to the detection directions of those portions. An alternative array of lenses may be characterised in that a portion of a leaf adjacent to the edge has zero focusing power and comprises a grating having alternate clear and opaque strips. The lens loss at the portions near the intersecting edge of the two leaves may be so large that it may be equally effective to discard the focusing action of the lens and rely on the interruption of radiation at the detector produced when the source moves transverse to the grating strips.

The array of lenses may be characterised in that the focal length of the lenses in one leaf is substantially less than the focal length of the lenses in the other leaf. Usually, the vertical distance to the floor under the intruder alarm will be materially less than the horizontal distance to possible sources out in the room. A more powerful focusing action is hence desirable for lenses in the horizontal leaf to get an adequate field of view for each lens. The field of view of a lens is given by the ratio of the detector size to the lens focal length, that is, the sensitive area of the detector as projected by the lens into the protected volume.

So far, lenses providing the function of simple positive lenses have been implied as the lenses used in the two leaves of the sheet. However, one form of detector which may be used with the lens array has a separated pair of pyroelectric detector elements connected to provide a signal related to the difference in radiation incident upon the two elements. A choice now has to be made as to the direction of separation of the elements in relation to the expected direction of source movement. Looking out into the volume, it will usually be desirable to have a horizontal separation of the elements so that horizontal source movement across the line of sight will produce a large difference in signal as the source image passes off one element and onto the other. However, in the case of an intruder entering the volume by a door (or window) vertically beneath the intruder alarm, the focused image will then move at right angles to the line of separation of the detectors and there will be little change in the radiation falling on the elements. To cope with this situation the array of lenses may be characterised in that the lenses in a leaf comprise cylindrical lenses having focusing power in one direction only, the cylinder axes of these lenses being inclined at an angle to the edge. The image of a source is now a concentrated line of radiation, parallel to the cylinder axis of the lens, which falls across the pair of detector elements at an angle. Movement of the source in any direction, except parallel to the cylinder axis, now produces some change in the difference radiation falling on the element pair.

To make it more difficult for an intruder to find a movement direction which does not produce a change in radiation on the detector, the array of lenses may be characterised in that the lenses in a leaf are arranged in rows parallel to the edge, and in that each lens in one row is adjacent the junction between a pair of adjacent lenses in an adjacent row. The arcuately displaced directions are now more interleaved and difficult to penetrate.

To further reduce the angle of incidence of the incoming radiation on the lenses, the array of lenses may be characterised in that a leaf is formed with facets lying in the plane of the leaf, in that each facet is set at an angle to the plane of the leaf and in that each facet comprises a lens. With a facet directed at the intended location of the detector, even though not normal to the associated direction, the angle of incidence can be materially reduced with consequent improvement in the amount of radiation reaching the detector.

According to another aspect the invention comprises a radiation source detection apparatus comprising a radiation detector set between the two leaves of an array of lenses as disclosed above, to receive focused radiation from the two leaves.

Furthermore, the apparatus may be characterised in that the radiation detector comprises two separated detector elements connected to provide an output signal related to the difference in radiation incident upon the two elements.

BRIEF DESCRIPTION OF THE DRAWINGS

Embodiments of the invention will now be described, by way of example, with reference to the accompanying drawings in which, FIG. 4 shows the total effective radiation received by the detector as a function of the off-axis angle of a fresnel lens, FIG. 5 shows a cross-section of one possible arrangement of lenses in the leaves of the sheet, FIG. 6 shows the radiation sensitive directions obtained using the FIG. 3 sheet of lenses, FIG. 7 shows an array of lenses having angled facets in the leaves, FIG. 8 shows two rows of alternated lenses in a leaf of the array, FIG. 9 shows the formation of a line image by a cylindrical lens angled to the line of separation of the pair of elements, FIG. 10 shows a horizontal leaf of a lens array having cylindrical lenses, and FIG. 11 shows an alternative array of two rows of cylindrical lenses.

DETAILED DESCRIPTION OF THE PREFERRED EMBODIMENTS

Figure 1:
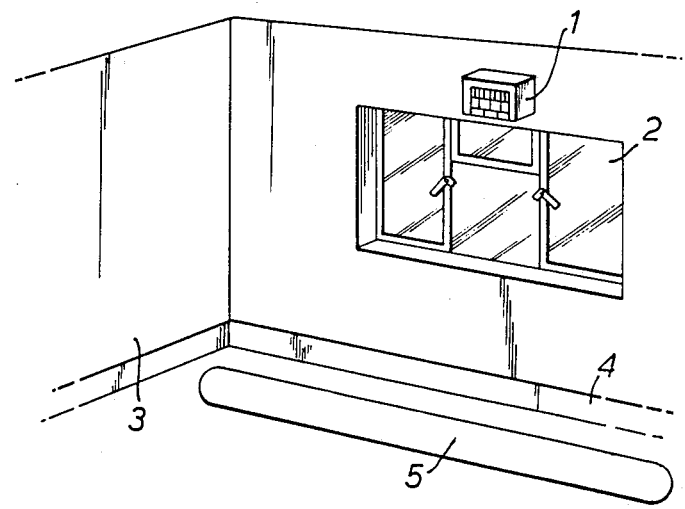
FIG. 1 shows a typical infrared intruder alarm installed over a window of a room.
Figure 2:
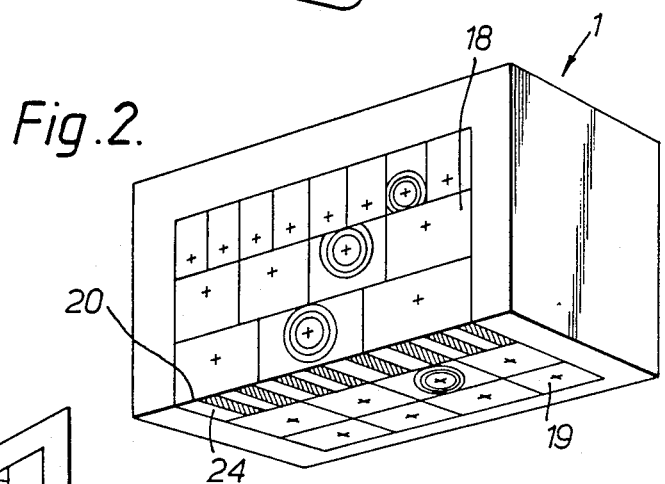
FIG. 2 shows the external view of the alarm of FIG. 1 in more detail.
Figure 3:
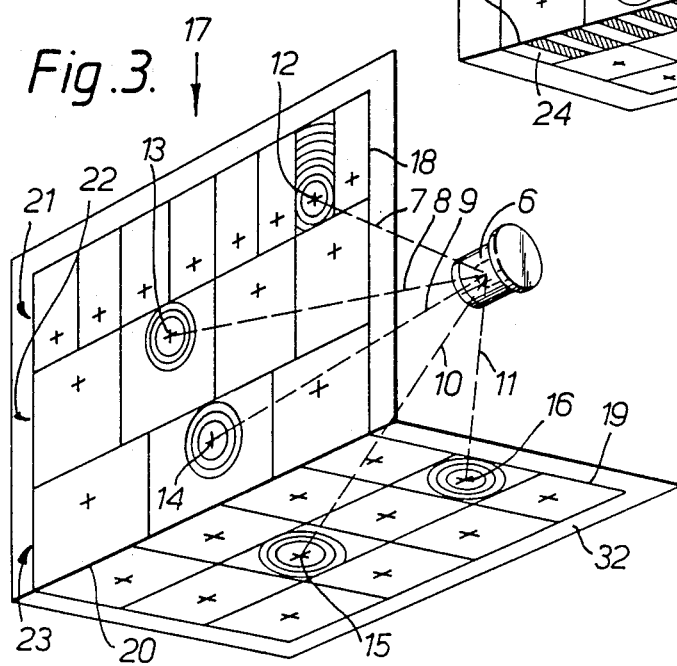
FIG. 3 shows an inside view of the FIG. 2 alarm with the detector in its designed location.

Refering to FIG. 1, an infrared intruder alarm 1 is shown installed over a window 2 so as to look out into the volume of a room 3 and also to look downwards across the plane of the window to a region 5 immediately in front of the skirting board 4. FIG. 2 shows an underneath perspective view of the alarm 1 of FIG. 1 and FIG. 3 shows an inside view of an alarm having an alternative arrangement of lenses with a detector 6 in the designed location. Radiation is received by the detector 6 from a plurality of arcuately displaced directions, such as directions 7, 8, 9, 10 and 11. Each direction is defined by the line joining the pole 12, 13, 14, 15 and 16 of an associated fresnel lens to the detector 6. The lenses are formed in a sheet 17 of radiation transmissive material. The sheet 17 comprises two planar leaves, 18 and 19, transverse to one another, the planes of the leaves intersecting at an edge 20. Each lens may occupy an arbitrarily shaped area and the pole of each lens may be located anywhere in the sheet. Normally the pole of a lens will be located within the area of that lens, but may be outside the lens area if it is desired to have a prismatic deflecting effect on the incoming radiation for a particular direction. In FIGS. 2 and 3 only a few of the annular zones of each lens are shown for clarity. FIG. 3 shows a lip 32 used for mounting the sheet 17 in the alarm. An important property of the flat leaves transverse to one another is that the moulding tool can be made adapted to produce a range of lens arrays having various sizes of the two leaves. Further, the sheet folded in this way has much improved mechanical rigidity, allowing simple mounting by the lip 32 to the alarm housing to obtain a rigid window with a good seal against dust, etc.

Each of the two leaves comprises a plurality of fresnel lenses, in this embodiment arranged in parallel rows to provide corresponding rows of arcuately displaced directions. In the centre of the top row 21 of the vertical leaf 18, the directions defined by the detector 6 and poles of the lenses are nearly normal to the plane of the lenses. In successively lower rows 22 and 23 the angles between the directions and the normal to the sheet become progressively greater, the more so towards the ends of each row. The amount of radiation reaching the limited sensitive area of the detector falls off with increasing angle between a lens normal and the defined direction due to three separate factors. The total reduction in detected radiation is given by the product of these three factors.

The first factor is the geometrical reduction in effective collecting area, that is the effective area within the rim of the lens. This reduction factor is given by cos x where x is the angle in degrees between the lens normal and the defined direction for that lens. The second factor is the loss of radiation by reflection at the front and back surfaces of the sheet which also increases with increasing x. The third factor is the degradation of the quality of the image produced by a titled lens due to the aberrations of a lens working off-axis. The effect is always to enlarge the image with increasing off-axis angles, throwing radiation off the sensitive area of the detector. It must be presumed that the source image on axis just fills the detector sensitive area.

FIG. 4 shows the total effective radiation received R at the detector due to the product of the above three factors as a function of the off-axis angle in degrees. It will be seen that the radiation is halved at 17 degrees off axis, but is reduced to only 10 per cent at twice this angle.

Thus, an attempt to provide vertical directions in the region 5 of FIG. 1 as well as the horizontal directions with a single vertical sheet would be difficult without incurring prohibitive radiation loss. But by providing a second, horizontal leaf of the sheet in accordance with the invention, the directions from the detector into region 5 can be much more nearly normal to the sheet, greatly enhancing the amount of radiation detected in the near vertical directions by reducing the amount of radiation lost by reason of the three factors mentioned above.

It must be noted that another factor which reduces the radiation received by the detector is the effective collection area of the detector as a function of the angle between the normal to the detector and the chief ray of the incident cone of focused radiation. However, the reduction factor is the cosine of the above angle so that even when this angle is 45 degrees, the apparent area is still 70 percent. Thus the fact that the detector normal may be inclined at as much as 45 degrees to a leaf of fresnel lenses only incurs a small penalty.

The loss in radiation when a fresnel lens, in particular, is working at large angles off-axis, such as 40 to 45 degrees, is so large that it may be as well to discard the lens and replace it by a simple grating of alternate clear and opaque strips as is shown at 24 in FIG. 2. As a source of radiation moves transverse to the strips, there will be a fluctuation in radiation incident on the detector as the shadow of the grating cast by the source passes over the detector. The grating strips are shown in FIG. 2 oriented to best detect motion parallel to the edge 20. But the strips can be set parallel to or at any angle to the edge to detect source motion in other directions.

FIG. 5 shows an alternative cross-section of the leaves of the sheet of fresnel lenses. In FIG. 5, the horizontal leaf 19 has only one row of large aperture lenses 25, but the vertical leaf 18 has two rows of lenses 26, 27 and a grating 28 where the angle of incidence on the leaf is large. In this particular embodiment of the invention, the focal length of the lenses in the vertical leaf is smaller than that of the lenses in the horizontal sheet to produce an intruder alarm which is more compact in the horizontal direction away from the wall.

FIG. 6 shows the angular range of radiation sensitive zones, in the vertical plane, obtained using the FIG. 3 sheet of lenses in an alarm installed 2 metres above the floor. The three rows of lenses in the horizontal leaf produce the zones 29, 30 and 31. Zone 29, covering region 5 of FIG. 1, is about 0.5 metres away from the wall at floor level. Thus the 'creep' zone is at 70 to 80 degrees down from the horizontal.

FIG. 8 shows an alternative layout of the lenses in the horizontal leaf. Three rows of lenses 47, 48 and 49 are shown parallel to the edge 20. Each lens 50 in one row is adjacent the junction between a pair of adjacent lenses 51 and 52 in the other row. The arcuately displaced directions defined by the poles of the lenses and the detector are now more interleaved and it is more difficult for an intruder to find a direction of motion which will avoid crossing a direction and generating a signal.

The high angles of incidence on some lenses of the array can be reduced to a considerable extent, while preserving the essentially flat form of the leaves of the sheet, as shown in FIG. 7, by forming the leaves with facets 33 to 44 lying in the planes of the leaves. Each facet is set at an angle to the plane of the leaf so as to direct the normal to the facet more towards the design position of the detector 45. Each facet may contain one or more lenses 46, three lenses being shown in this example.

The infrared detector used in conjunction with the array of lenses to form a radiation source detection apparatus may be a single element pyroelectric detector, such as Philips type number RPY 100 (Trade Mark) having a single detector element 2 mm by 1 mm in size. Alternatively a dual element detector may be used, such as Philips type number RPW 100 having two elements 2 mm by 1 mm side by side with long sides adjacent separated by a 1 mm gap. The elements in this dual type of detector are connected to provide a signal indicating the difference in radiation incident upon the two elements. Thus a signal will be produced as the image of a source passes off one element and onto the other. Motion of a source image along the gap between the elements will not produce a signal. The lenses in the array can, however, be cylindrical lenses having focusing power only in planes at right angles to the cylinder axis and FIGS. 9 and 10 show how source motion can be detected using such a cylindrical lens in conjunction with a dual element. FIG. 9 shows a cylindrical fresnel lens 53 forming a line image 57 of a small source on a dual element detector 55. FIG. 9 shows how the cylinder axis of the lens can be set at an angle to the detector separation so that the line image falls at an angle across the detector pair. Motions 58 and 59 across and along the dual detector 55 produce a change in radiation difference on the two elements as the line image moves off the end of one element of the pair but remains on the other element.

FIG. 10 shows a horizontal leaf 19 of an array of lenses having two rows 60, 61 of cylindrical fresnel lenses. The cylinder axes 62, 63 are set at an angle to the edge 20, adjacent lens axes being at opposite angles. Additionally the lenses in row 60 are each adjacent the junction of a pair of adjacent lenses in row 61. Thus a pattern of linear zones is provided which makes the monitored volume difficult to penetrate without generating a signal. In practical embodiments the cylinder axes 62,63 would be set at angles between 20 and 45 degrees to the edge 64 of the leaf.

Since in a cylindrical lens there is focusing power in only one direction, the aperture of the lens in a direction parallel to the cylinder axis need only be large enough to ensure that all parts of the detector can receive radiation arriving undeviated from all parts of the typical source. Referring to FIG. 9 the largest dimension of the detector pair is the diagonal, which, for the RPW 100 detector mentioned above, is 3.6 mm. Allowing for a typical source size, a human head and shoulders, at the typical detection range of a few metres, the lens need only be some 5 mm. wide in the axis direction in this example. In the transverse direction having focusing power, the lens aperture would, for example, be large enough to provide F/1 power. With, for example, a focal length of 12 mm, the lens aperture would be 12 mm. in the direction transverse to the cylinder axis. Such a lens forms a line image 5 mm. Long of the source, sufficient to illuminate the detector fully when aligned in the direction associated with that lens.

FIG. 11 shows an alternative array of two parallel rows 65,66 of cylindrical lenses in a leaf 67. The apertures of the lenses are rectangles, all of equal width, with a length to width ratio of typically 12 to 5 in the above example. The cylinder axis 68 of each lens is parallel to the rectangle width. The rectangles in any one row are of equal length, the long sides 69 of the rectangles in a row abutting one another at an angle of 45 degrees to the row length defined by the aligned rectangle centres 70. The long sides of the rectangles in row 65 are at right angles to the long sides of the rectangles in adjacent row 66. The serrated edges of the two rows of lens apertures nest with one another in the manner of parquet tiles on a floor, making full use of the leaf area for lens apertures. It should be noted that to achieve nesting of the serrated edges of adjacent rows, it is only necessary that rectangle widths in all rows be equal and that the rectangle lengths in any one row be equal. Adjacent rows can have different rectangle lengths and hence the lens apertures of adjacent rows can be different.

Alternatively a single row of rectangular aperture cylindrical lenses may be used with the long sides of the rectangle abutting one another at an angle other than 45 degrees to the row length. Larger rectangular apertures may then be possible so that, for example, the length of the line image can be greater, affording a wider detection zone in the direction parallel to the cylinder axis.

I claim:

1. An array of lenses for directing and concentrating radiation from a plurality of arcuately displaced directions onto a detector, said lenses being formed as planar radiation concentrators in a sheet of radiation transmissive material, characterised in that the sheet comprises two planar leaves transverse to one another, the planes of the leaves intersecting at an edge, and in that each leaf comprises a plurality of planar radation concentrators.

2. An array of lenses as claimed in claim 1 characterised in that the planar radiation concentrators are fresnel lenses.

3. An array of lenses as claimed in claim 1, characterised in that a portion of a leaf adjacent to the edge has zero focusing power and comprises a grating having alternate clear and opaque strips.

4. An array of lenses as claimed in claim 1, characterised in that the focal length of the lenses in one leaf is substantially less than the focal length of the lenses in the other leaf.

5. An array of lenses as claimed in claim 1, characterised in that the lenses in a leaf are arranged in rows parallel to the edge, and in that each lens in one row is adjacent the junction between a pair of adjacent lenses in an adjacent row.

6. An array of lenses as claimed in claim 1, characterised in that the lenses in a leaf comprise cylindrical lenses having focusing power in one direction only, the cylinder axes of these lenses being inclined at an angle to the edge.

7. An array of lenses as claimed in claim 6, characterised in that the apertures of the cylindrical lenses in a leaf are rectangular, in that the cylinder axis of each lens is parallel to the short side of the rectangle, in that a row of lenses is formed in the leaf with the long sides of the rectangles abutting one another at an angle to the row length.

8. An array of lenses as claimed in claim 7, characterised in that the rectangles are of equal width, in that parallel rows of lenses are formed in the leaf with the rectangles in any one row of equal length, in that the rectangle sides are at 45 degrees to the row length, and in that the long sides of the rectangles of one row are at right angles to the long sides of the rectangles of an adjacent row, the serrated edges of adjacent rows nesting with one another.

9. An array of lenses as claimed in claims 1, characterised in that a leaf is formed with facets lying in the plane of the leaf, in that each facet is set at an angle to the plane of the leaf, and in that each facet comprises a lens.

10. A radiation source detection apparatus comprising a radiation detector set between the two leaves of an array of lenses as claimed in claims 1, set to receive focused radiation from the two leaves.

11. A radiation source detection apparatus comprising a radiation detector set between the two leaves of an array of lenses as claimed in claim 9, to receive focused radiation from the two leaves, and the facets in the leaves being directed at the detector.

12. A radiation source detection apparatus as claimed in claim 10, characterised in that the radiation detector comprises two separated detector elements connected to provide an output signal related to the difference in radiation incident upon the two elements.

* * * * *